United States Patent
Tinsley

(10) Patent No.: US 12,425,113 B2
(45) Date of Patent: Sep. 23, 2025

(54) INLINE INSITU CALIBRATION OF MIMO WIRELESS COMMUNICATION SYSTEMS

(71) Applicant: Tektronix, Inc., Beaverton, OR (US)

(72) Inventor: Keith R. Tinsley, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 251 days.

(21) Appl. No.: 18/357,978

(22) Filed: Jul. 24, 2023

(65) Prior Publication Data

US 2024/0039645 A1    Feb. 1, 2024

Related U.S. Application Data

(60) Provisional application No. 63/401,516, filed on Aug. 26, 2022, provisional application No. 63/392,838, filed on Jul. 27, 2022.

(51) Int. Cl.
| | |
|---|---|
| *H04B 17/12* | (2015.01) |
| *H04B 7/0413* | (2017.01) |
| *H04B 17/16* | (2015.01) |
| *H04B 17/21* | (2015.01) |

(52) U.S. Cl.
CPC ............ *H04B 17/12* (2015.01); *H04B 17/16* (2015.01); *H04B 17/22* (2023.05); *H04B 7/0413* (2013.01)

(58) Field of Classification Search
CPC ........ H04B 17/12; H04B 17/16; H04B 17/22; H04B 7/0413
See application file for complete search history.

(56) References Cited

U.S. PATENT DOCUMENTS

| | | | |
|---|---|---|---|
| 7,469,152 B2 | 12/2008 | Cetiner et al. | |
| 9,628,256 B2 | 4/2017 | O'Keeffe et al. | |
| 11,115,136 B1 | 9/2021 | Kim et al. | |
| 11,546,925 B2 | 1/2023 | Kang et al. | |
| 12,223,421 B2 * | 2/2025 | Lee | H04L 5/0055 |
| 2009/0093222 A1 | 4/2009 | Sarkar | |
| 2019/0356516 A1 | 11/2019 | Cao et al. | |
| 2023/0006913 A1 * | 1/2023 | Lo | H04L 41/0853 |
| 2024/0204894 A1 * | 6/2024 | Park | G01S 5/0236 |

FOREIGN PATENT DOCUMENTS

| | | |
|---|---|---|
| CN | 111010219 A | 4/2020 |
| CN | 111294096 A | 6/2020 |

* cited by examiner

*Primary Examiner* — Janice N Tieu
(74) *Attorney, Agent, or Firm* — Miller Nash LLP; Andrew J. Harrington

(57) ABSTRACT

A communication system includes one or more transmitters, each transmitter to: transmit communication signals using a defined signaling protocol with multiple antenna elements to a target receiver, the communication signals containing known specific transmit sequences spread across a frequency spectrum of the communication signals to be detectable only by receivers having the known specific transmit sequences, and receive feedback from the target receiver indicating any errors in reception of the communication signals based upon the known specific transmit sequences, and a machine learning system to use configuration of the multiple antenna elements when the communication signal was sent and the feedback to predict preconfigured settings for transmitters. A test and measurement system located at a base station, a signal generator to generate one or more signals having a predetermined modulation format, a receiver to receive the one or more signals, and a machine learning system to develop a calibration matrix.

15 Claims, 3 Drawing Sheets

INLINE INSITU CALIBRATION OF MIMO WIRELESS COMMUNICATION SYSTEMS

CROSS-REFERENCE TO RELATED APPLICATIONS

This disclosure claims benefit of U.S. Provisional Application No. 63/392,838, titled "INLINE CALIBRATION OF A MIMO WIRELESS COMMUNICATION SYSTEM," filed on Jul. 27, 2022, and U.S. Provisional Application No. 63/401,516, titled "MIMO BASE STATION AND BEAMFORMING CALIBRATION METHODS," filed on Aug. 26, 2022, the disclosures of both which are incorporated herein by reference in their entirety.

TECHNICAL FIELD

This disclosure relates to test and measurement systems for wireless communications systems, more particularly to systems and methods for calibration of these systems during normal operations.

BACKGROUND

WiFi/5G/6G/IoT based wireless communications are poised to be ubiquitous and critical components of the $21^{st}$ century global marketplace; these systems will be the backbone of financial, logistical, and governmental communications as companies, commercial entities, and countries, deliver information to users at any time or at any moment. And these wireless systems will utilize the latest in technology to deliver required system performance. They will use Multiple Input/Multiple Output (MIMO) and modulation techniques such as Orthogonal Frequency Division Multiplexing (OFDM) technologies. MIMO systems are simply immense sets of phase array antenna systems that produce single-carrier (SC) or multi-carrier (MC) phase amplitude modulated waveforms, all designed to deliver superior wireless data rates. However, a large problem exists in that these systems need to constantly calibration on an ever-increasing basis to ensure peak performance through system setups—beam alignments—that ensure targeted performance metrics, given dynamically changing RF environments, termed Initial Access (IA).

Specifically, the large MIMO systems, for example, spanning on the order of 64 transmitter elements and 64 receiver elements, need periodic alignment and recalibration, not unlike a typical measurement scope or spectrum analysis equipment. This calibration operation takes time, money, and labor. Moving the system to an offline state to perform the required action becomes untenable as performance metric demands increase. It means lost revenue to the owner, system integration or service provider. The embodiments herein address these issues.

DESCRIPTION

The embodiments herein generally include an inline— "silent"—method of calibration that allows for alignment of MIMO beam systems in union with nominal or normal wireless communication operations; that is, an "in situ" method of calibrating such MIMO systems that does not require said system, or supporting equipment, to be placed "offline". Calibration may include, but is not limited to, their corresponding optimal signal amplitude, phase, or a combination of both.

The embodiments allow for transmission and reception of highly correlated data sequences that are masked as "colored noise," being detectable from typical atmospheric noise. The term "colored noise" means any noise that is not "white noise," which is typically natural and undetectable, subsumed as statistical errors, or nuisance terms, that perturb desired signals. Being detectable, the noise in which the data sequences travels allow for strong timing recovery at proprietary RF receivers. This provides feedback to the source, meaning the unit under calibration.

The calibration generally involves modification of phase shifters to ensure transmitted beamwidths are accurate and precise. The receiver "knows" the transmitted sequences, also called code words or known specific transmit sequences having distinct time and frequency properties. Autocorrelation of the transmitted codes, corresponding to a priori antenna beam angles, results in an "error" or mismatch between what the receiver received and what it expected. The receiver can then provide feedback to the transmitter. The transmitter can then adjust the phase shifters, or antenna elements in the array, to correct the error.

One should note that while most approaches result in the transmitter making the adjustment to "steer the beam" to increase the accuracy of the received signal, the receiver may make the adjustment. In one embodiment, the receiver returns the phase/timing differences to the transmitter to allow the transmitter to adjust the phase shifters in the antenna array. The receiver may send this feedback on a different channel, such as Ethernet, or optical link, etc. In another embodiment, the receiver applies the phase differences to the array of receivers to align them to the transmitter signal.

One aspect of the embodiment uses a machine learning system to preconfigure transmitters in the communication system. Using the data gathered from the sent code word, error present at the received code word, and the adjustments made to correct for the error, a machine learning (ML) system or model can be trained to provide preconfiguration settings for each square meter or square kilometer in the area in which the system operates. As a transmitter moves, such as in a mobile phone, or a car, the ML system can provide preconfiguration of the transmitter to speed the calibration process with little or no downtime.

Figure 1:
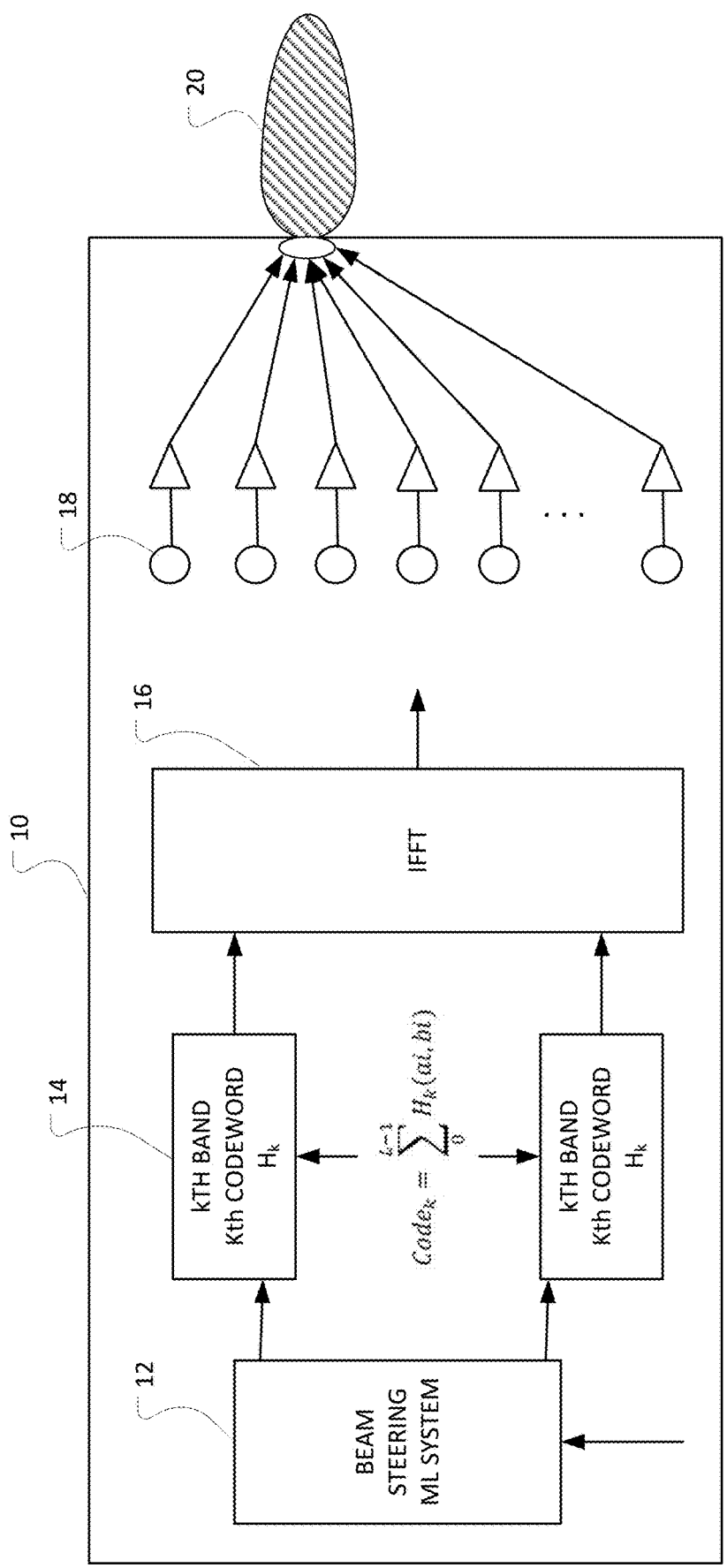
FIG. 1 shows transmitter configured to perform calibration and beam steering during normal transmitter operation.

FIG. 1 shows an embodiment of a transmitter 10 configured to operate in such a manner. The ML 12 system may comprise a trained model or may just have the data derived from the trained model stored to be accessible for the transmitter as needed. The ML system may receive updates, including re-training, as the overall communications system continues to evolve and change. The system employs some form of modulation of RF energy to send communication signals. In a MIMO system, the system normally transmits the same signal on multiple antenna components in an array of antennas. Sending multiple copies of the same signal allows for minimization of errors and improves the capacity of the radio transmissions. MIMO systems have become more common. The $3^{rd}$ Generation Partnership Project (3GPP) added MIMO with Release 8, and wi-fi networks using the IEEE standard 802.11n, Long Term Evolution (LTE) systems, and fifth generation (5G) technology all support MIMO.

The MIMO system transmits communications systems using some form of modulation of electromagnetic energy in the RF frequency range. The communication signals may use many different types of modulation such as different types of Frequency Division Multiplexing (FDM) modulation including Orthogonal (OFDM), Time Division Multiplexing (TDM), Quaternary Amplitude Modulation (QAM), Phase Shift Keying (PSK), and many others. While no limitation is intended, and none should be inferred, OFDM provides a good example of a modulation protocol for the embodiments. The orthogonality aspect means that the signals sent using OFDM do not interfere with each other.

As discussed above, one advantage of the embodiments herein lies in the use of code words, or known specific transmit sequences, sent within the modulated signal. To avoid having to take the transmitter or system offline to calibrate it, by sending code words within the modulated signal, the receiver(s) that 'know' the code word can decode it to determine errors in the transmission, where the errors generally represent mismatches between the phase shifters at the transmission end and the receiving end. The receiver performs autocorrelation to access the transmission channel and determine if differences exist between the received code and the expected code. An example of such a code-based protocol is CDMA, code-division multiple access.

The transmitter can 'hide' the code word in the modulated signal by spreading the code data across the frequency spectrum of the signal. Receivers that do not 'know' the code will not notice the noise. This allows the system to remain online during calibration of a transmitter. In FIG. 1, the transmitter may configure the antenna based upon the predictions provided by the ML system. The code words such as 14 undergo transformation by the inverse Fast Fourier Transform (IFFT) at the sender side at 16, which matches with FFT on the receiver side. The signal is then multiplexed such as with OFDM and transmitted through the antenna elements such as 18. The main part of the signal forms the lobe 20 that the system controls to provide accurate communication signals.

Figure 2:
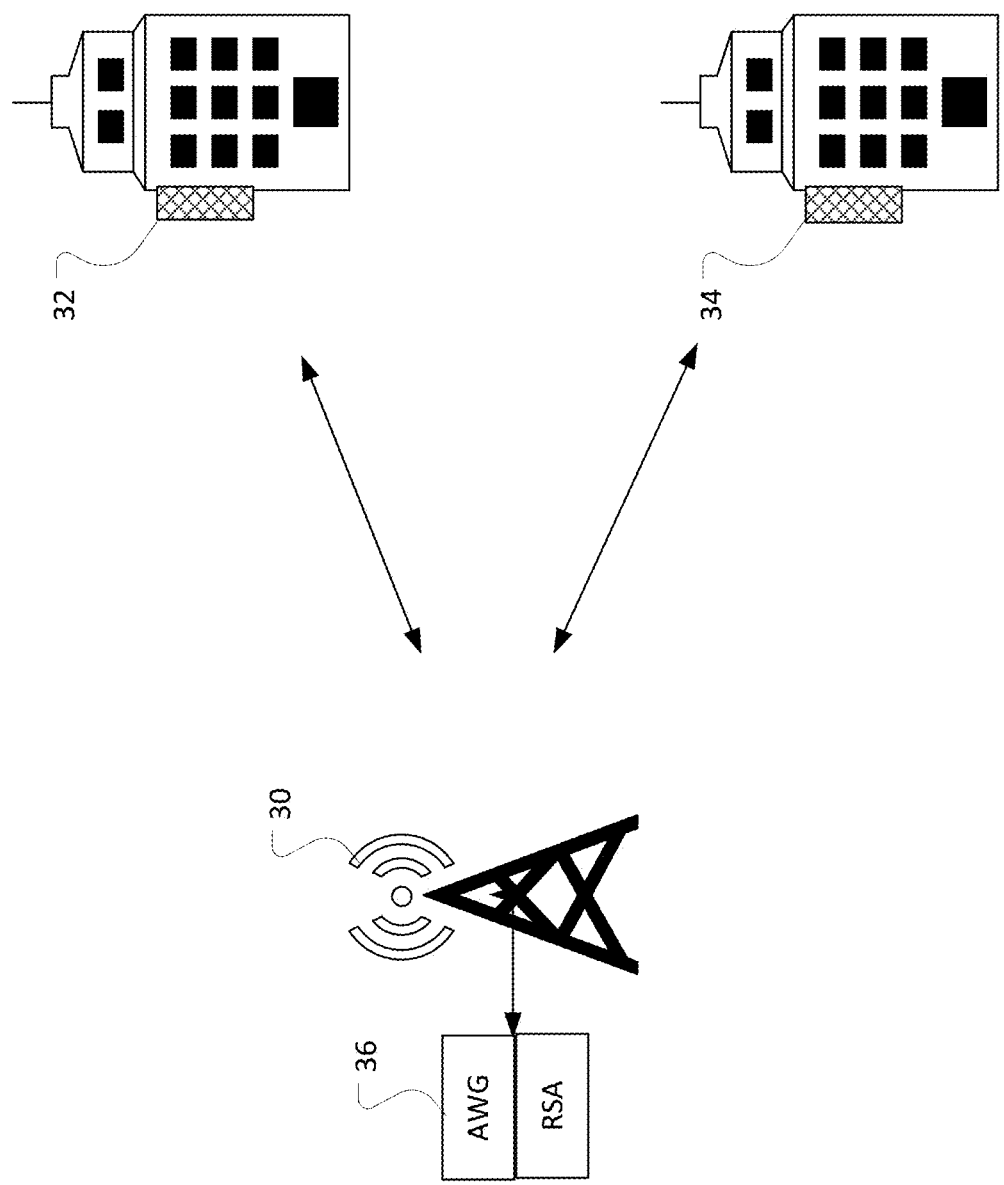
FIG. 2 shows an embodiment of a transmission system using reflectors for calibration.

The communication system may include the transmitter and the receiver, not shown, remote from each other or co-located as shown in FIG. 2 and can undergo calibration as set out above. In another embodiment, the system may have the transmitter and receiver co-located. In order to calibrate the system then, the base station 30 may include a test and measurement instrument, such as 36. The test and measurement instrument may comprise a "compound" instrument made up of different types of instruments combined to act as one or may comprise a single instrument. In the embodiment of FIG. 2, the instrument comprises an arbitrary waveform generator (AWG) and a real-time spectrum analyzer (RSA) or, possibly, a high-speed oscilloscope. The AWG provides the base station with the signal to be transmitted, and the RSA analyzes the received signal.

In order to transmit and receive the same signal, the system employs one or more reflectors such as 32. The reflectors may comprise active reflectors where they actively operate on the incoming signal as they reflect it back, or passive reflectors that only perform limited operations, such as phase shifts, during reflection. The base station may operate in a system with other receives and transmitters as the one discussed above, but in this manner the base station can perform a built-in self-test (BIST).

The AWG generates a signal and transmits it to one or more reflectors such as 32 or 34. The reflectors may receive the signal and reflect it back, and the receiver detects any necessary adjustments needed such that the received signal matches the transmitted signal. Alternatively, the reflector may adjust the signal it receives to allow the receiver to 'see' the received signal as the same as the transmitted signal. The adjustment made by the reflector may travel with the resulting signal to allow the system to track the error and adjustment data for the ML system shown in FIG. 1.

The BIST process may occur using the techniques discussed above, or during, but not limited to, "free periods" or resource slots to avoid interference with the system operation. The base station sends the signal and will receive it, and at some point, will adapt the signal, either at the receiver, the reflector, or the transmitter. The RSA can then analyze the results. The machine learning uses all the information to develop a calibration matrix and a pre-coded channel state information (CSI) matrix or a beam-steering prediction matrix (BPM). This will lead to faster CSI and BPM estimates instead of the traditional methods used in standards such as in 3GPP through sharing of learn ML channel parameters.

Figure 3:
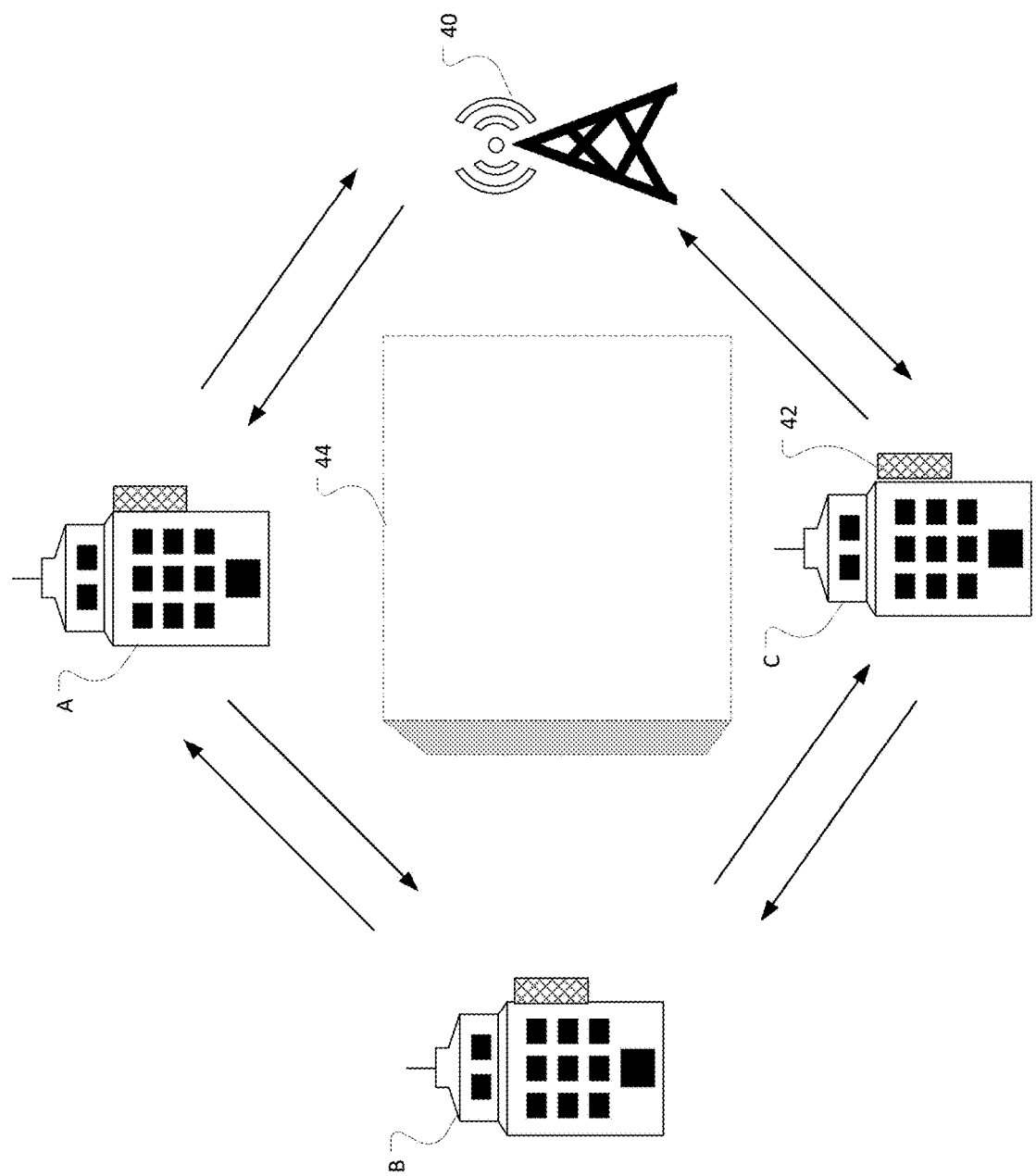
FIG. 3 shows an embodiment of a transmission system using reflectors to configure channels for a non-line of sight node.

This process and system can also adapt to non-line of sight target antennas such as that shown in FIG. 3. An example embodiment includes a closed loop Built-in-self-test (BIST) method that uses transmission sources, such as an AWG, for transmission of various modulation formats. A beam forming antenna sends the transmission to a down-range target. The target may comprise a Reconfigurable Intelligent Surface (RIS) metamaterial such as 42. The reflector may reflect the transmission back to the base station 40 for calibration the of MIMO antenna. As discussed above, the receiver sensor may comprise an RSA, located at stations A and C. Stations or nodes A and C are chosen because they are components of the 3-tuple (A,B,C). Station B represents the non-line-of-sight (NLOS) "smart repeater" to be used to circumvent a communication obstacle, building, or obstruction 44.

Initially, the process determines, apriori, uncertainty contained in MIMO stations A and C. The K1 represents the uncertainty between A and B–H(A|B)H(B)=H(B|A)H(A). K2, which does not equal K1, represents the uncertainty between C and B–H(C|B)H(B)=H(B|C)H(C). By using calibration signaling, the channel performance to stations A and C from the base station can be determined and the following equation is valid. With uncertainty removed, A and C are independent. H(A,C)=H(A)H(C).

The machine learning system can then construct a model to optimize station B remotely as a service through corrections of amplitude coefficients, phase coefficients or both. With the know channels of A and C, the system can determine how close H(B|A,C) is to H(B), but measuring H(A, B, C) using known signal characteristics and then dividing by H(A)H(C).

As shown in FIG. 3, this allows for optimization of H(B|A,C) which represent the closed loop NLOS beam steering application, and the nominal CSI metrics, contained in H(A,B,C) can be augmented with knowledge of H(A) and H(C) to achieve optimal channel conditions and ensure calibrated communications.

The embodiments may use a remote-controlled node, B, capable of being calibrated, to create far-field RF channel conditions for optimal performance of MIMO antenna systems. This node may remove undesirable phase shifts or amplitude various. This data is passed to the traditional CSI base station coordination schemes so at to improve RF communication performance in pre-coding methods/ schemes, but it is not limited to RIS devices. Embodiments may be used to control smart repeaters. "Smart repeaters" will require constant calibration or understanding of beam steering uncertainties. Embodiments here can be used to meet these needs.

The calibration methods according to the embodiments differ from traditional CSI channel estimation methods in the following ways. As discussed above, resource slots or "free period" are used to send calibration signals for periodic, offline, calibration of MIMO antenna systems. The BIST comprises a closed loop algorithm is employed that utilizes TX-RIS-RX resources to send, adapt and analyze RF calibration signals. The ML system derives a calibration matrix used as a seed for a pre-coded CSI matrix, leading to faster CSI estimates via traditional standard methods, detailed in the 3GPP standard. The method uses ancillary/ independent RF sources/sinks and Digital Signal Processing components that augment existing base station equipment.

For the embodiment with the remote node, the process makes an apriori determination of H(A) and H(C) through means other than traditional UE-Base station CSI information. The process then uses this information in an optimization algorithm to determine calibration of far, NLOS, node, station B.

In summary, calibration methods according to embodiments of the disclosure complement and enhance existing RF Channel State Estimation methods contained in the 3GPP standard (Rel 18 and beyond) through employing non-OFDM RF signaling to conduct the task of MIMO calibration.

Aspects of the disclosure may operate on a particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a communication system, comprising: one or more transmitters, each transmitter configured to: transmit communication signals using a defined signaling protocol with multiple antenna elements to a target receiver, the communication signals containing known specific transmit sequences spread across a frequency spectrum of the communication signals to be detectable only by receivers having the known specific transmit sequences; and receive feedback from the target receiver indicating any errors in reception of the communication signals based upon the known specific transmit sequences; and a machine learning system to use configuration of the multiple antenna elements when the communication signal was sent and the feedback to predict preconfigured settings for transmitters in the communication system.

Example 2 is the communication system of Example 1, wherein the defined signaling protocol comprises one of orthogonal frequency division multiplexing (OFDM), frequency division multiplexing (FDM), Time Division Multiplexing (TDM), and Quadrature Amplitude Modulation (QAM).

Example 3 is the communication system of either of Examples 1 or 2, wherein the bandwidth of the known specific transmit sequences have a narrower bandwidth than the communication signals.

Example 4 is the communication system of any of Examples 1 through 3, wherein the known specific transmit sequences comprise code-division multiple access (CDMA) code words.

Example 5 is the communication system of any of Examples 1 through 4, wherein the preconfigured settings include one or more of phase and angle of the antenna elements, and channel state information.

Example 6 is the communication system of any of Examples 1 through 5, wherein the transmitter is one of either remote from the target receiver, or co-located with the target receiver.

Example 7 is the communication system of any of Examples 1 through 6, further comprising a reflector to receive the communication signals and reflect them back to the target receiver.

Example 8 is a test and measurement system located at a base station, comprising: a signal generator configured to generate one or more signals having a predetermined modulation format; a transmitter comprised of multiple antenna elements configured to transmit the one or more signals to one or more reflectors configured to reflect the one or more signals back towards the base station; a receiver configured to receive the one or more signals; and a machine learning system configured to use the one or more signals transmitted, the one or more signals received, and any adjustments made to the one or more signals transmitted to develop a calibration matrix.

Example 9 is the test and measurement system of Example 8, wherein one of either the one or more reflectors or the receiver act as an adjuster and are configured to make adjustments to the signals transmitted.

Example 10 is the test and measurement system of Example 9, wherein the adjuster is configured to: receive the one or more signals from the transmitter; adjust any undesirable phase shifts and amplitude variations; and return the adjustments to the machine learning system at the base station.

Example 11 is the test and measurement system of any of Examples 8 through 10, wherein the signal generator comprises an arbitrary waveform generator, AWG, and the receiver comprises a real-time spectrum analyzer, RTSA.

Example 12 is the test and measurement system of any of Examples 8 through 11, wherein at least one of the one or more reflectors comprises a reconfigurable intelligent surface, MS.

Example 13 is the test and measurement system of Example 12, wherein the MS is one of static or dynamic.

Example 14 is the test and measurement system of Example 12, wherein the one or more reflectors comprise first and second reflectors, each in line of sight with the base station, and the test and measurement system is further configured to: determine channel performance of a first channel between the base station and the first reflector, and of a second channel between the base station and the second reflector; and use the performance of the first channel and the second channel to calibrate a channel between a non-line of sight node and the first and second reflectors.

Example 15 is the test and measurement system of any of Examples 8 through 14, wherein: the signal generator is further configured generate the one or more signals and to include known specific transmit sequences spread across a frequency spectrum of the one or more signals to be detectable only by receivers having the known specific transmit sequences; and the receiver is further configured to receive the signals including the known specific transmit sequences.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:

1. A communication system, comprising:
one or more transmitters, each transmitter configured to:
   transmit communication signals using a defined signaling protocol with multiple antenna elements to a target receiver, the communication signals containing known specific transmit sequences spread across a frequency spectrum of the communication signals to be detectable only by receivers having the known specific transmit sequences; and
   receive feedback from the target receiver indicating any errors in reception of the communication signals based upon the known specific transmit sequences; and
a machine learning system to use configuration of the multiple antenna elements when the communication signal was sent and the feedback to predict preconfigured settings for transmitters in the communication system.

2. The communication system as claimed in claim 1, wherein the defined signaling protocol comprises one of orthogonal frequency division multiplexing (OFDM), frequency division multiplexing (FDM), Time Division Multiplexing (TDM), and Quadrature Amplitude Modulation (QAM).

3. The communication system as claimed in claim 1, wherein the bandwidth of the known specific transmit sequences have a narrower bandwidth than the communication signals.

4. The communication system as claimed in claim 1, wherein the known specific transmit sequences comprise code-division multiple access (CDMA) code words.

5. The communication system as claimed in claim 1, wherein the preconfigured settings include one or more of phase and angle of the antenna elements, and channel state information.

6. The communication system as claimed in claim 1, wherein the transmitter is one of either remote from the target receiver, or co-located with the target receiver.

7. The communication system as claimed in claim 1, further comprising a reflector to receive the communication signals and reflect them back to the target receiver.

8. A test and measurement system located at a base station, comprising:
- a signal generator configured to generate one or more signals having a predetermined modulation format;
- a transmitter comprised of multiple antenna elements configured to transmit the one or more signals to one or more reflectors configured to reflect the one or more signals back towards the base station;
- a receiver configured to receive the one or more signals; and
- a machine learning system configured to use the one or more signals transmitted, the one or more signals received, and any adjustments made to the one or more signals transmitted to develop a calibration matrix.

9. The test and measurement system as claimed in claim 8, wherein one of either the one or more reflectors or the receiver act as an adjuster and are configured to make adjustments to the signals transmitted.

10. The test and measurement system as claimed in claim 9, wherein the adjuster is configured to:
- receive the one or more signals from the transmitter;
- adjust any undesirable phase shifts and amplitude variations; and
- return the adjustments to the machine learning system at the base station.

11. The test and measurement system as claimed in claim 8, wherein the signal generator comprises an arbitrary waveform generator, AWG, and the receiver comprises a real-time spectrum analyzer, RTSA.

12. The test and measurement system as claimed in claim 8, wherein at least one of the one or more reflectors comprises a reconfigurable intelligent surface, RIS.

13. The test and measurement system as claimed in claim 12, wherein the RIS is one of static or dynamic.

14. The test and measurement system as claimed in claim 12, wherein the one or more reflectors comprise first and second reflectors, each in line of sight with the base station, and the test and measurement system is further configured to:
- determine channel performance of a first channel between the base station and the first reflector, and of a second channel between the base station and the second reflector; and
- use the performance of the first channel and the second channel to calibrate a channel between a non-line of sight node and the first and second reflectors.

15. The test and measurement system as claimed in claim 8, wherein:
- the signal generator is further configured generate the one or more signals and to include known specific transmit sequences spread across a frequency spectrum of the one or more signals to be detectable only by receivers having the known specific transmit sequences; and
- the receiver is further configured to receive the signals including the known specific transmit sequences.

* * * * *